United States Patent [19]

Frankel

[11] 4,192,601
[45] Mar. 11, 1980

[54] CAMERA QUADRIPOD

[76] Inventor: Robert S. Frankel, 11905 Woodbridge St. #10, Studio City, Calif. 91604

[21] Appl. No.: 966,218

[22] Filed: Dec. 4, 1978

[51] Int. Cl.² .................. G03B 17/00; A47B 23/00
[52] U.S. Cl. ............................. 354/293; 248/441 R; 248/453
[58] Field of Search ............... 354/293, 292, 294, 295; 248/649, 650, 441 R, 447, 453, 454–456, 201; 352/243

[56] References Cited

U.S. PATENT DOCUMENTS

| | | | |
|---|---|---|---|
| 1,787,309 | 12/1930 | Goldbeck | 354/293 X |
| 1,907,754 | 5/1933 | Dina | 248/649 X |
| 1,991,493 | 2/1935 | Cornelius | 248/650 |
| 2,004,238 | 6/1935 | Fithian | 248/650 |
| 2,638,041 | 5/1953 | Horydczak | 354/293 |
| 3,147,948 | 9/1964 | Evanoff | 248/455 |
| 3,358,951 | 12/1967 | Carter | 248/650 |
| 3,821,771 | 6/1974 | Johnson et al. | 354/293 |
| 4,060,216 | 11/1977 | Million | 248/454 X |

FOREIGN PATENT DOCUMENTS 651131  10/1937  Fed. Rep. of Germany ........... 248/453

*Primary Examiner*—Michael L. Gellner
*Assistant Examiner*—S. Wade
*Attorney, Agent, or Firm*—Allan M. Shapiro

[57] ABSTRACT

The camera quadripod is formed of a pair of bipods, each having a pair of adjustable feet and each having a pair of arms which can embrace a camera. The pair of bipods cooperate together in conjunction with the camera body so that they become a quadripod and serve to support the camera. The adjustment of the legs controls the orientation of the camera. The bipods are small enough to be carried in the photographer's pocket when not in use, and are quickly and easily engaged on and removed from the camera body.

17 Claims, 3 Drawing Figures

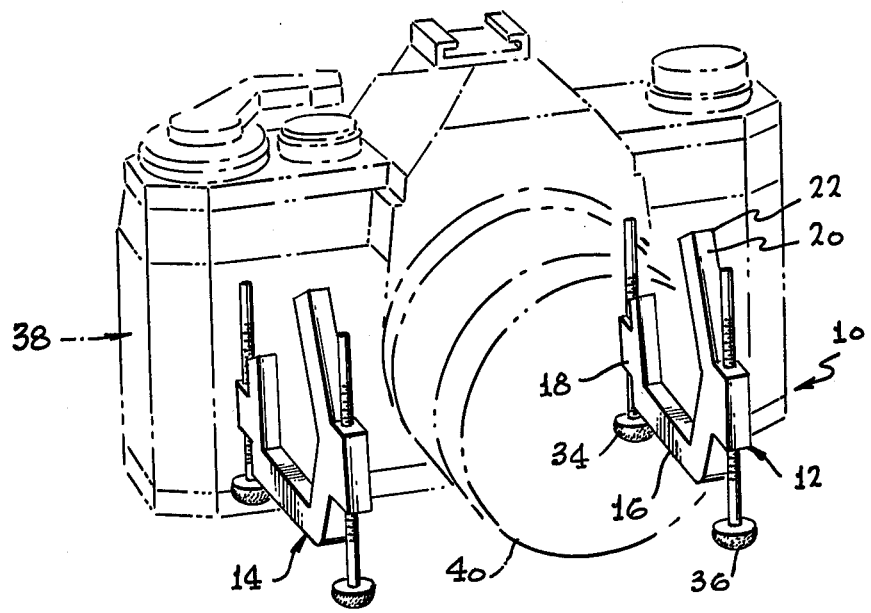
Fig. 1
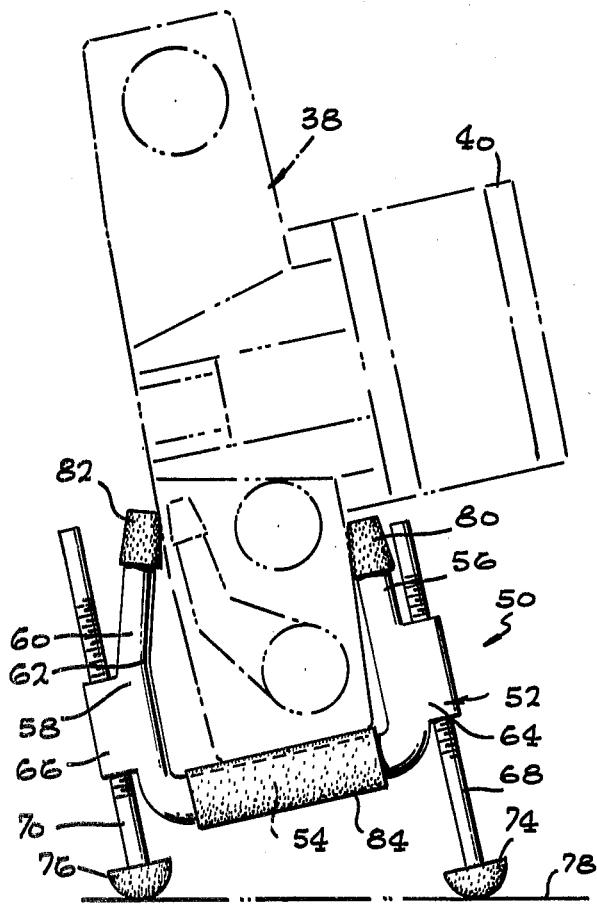
Fig. 3
Fig. 2

CAMERA QUADRIPOD

BACKGROUND OF THE INVENTION

1. Field of the Invention

The camera quadripod of this invention is a camera support and thus is broadly in the field of camera tripods and similar structures. The field broadly includes those devices which engage in the threaded support hole provided on most cameras. However, the camera quadripod of this invention directly engages on the camera body.

2. Description of the Prior Art

In a number of cases, it is necessary or helpful to physically support a camera independently of the support physically provided by the photographer. In non-studio situations, the camera is usually handheld with the photographer providing the physical support and stability required by the camera for picture taking. Under some photographic conditions, the exposure time is sufficiently long that the photographer cannot personally support the camera in a sufficiently steady manner that a sharp picture can be taken. Under these circumstances, other support for the camera is required. Furthermore, in some cases, the photographer desires to be in a different position when the picture is taken. For example, he may wish to be in the field of the photograph.

To provide this support, each camera body is furnished with a screwthreaded opening (usually called the tripod socket). Tripods and other similar supports have a screwthreaded stud which fits into this opening. The three legs of the tripod engage the ground or other supporting surface and, accordingly, the camera is supported. A number of tripod designs are available, and choice is usually between a very portable, lightweight unit and one that is sturdy and rigid.

In addition to tripods, other support devices have been designed for engaging in the tripod socket of the camera to provide camera support. However, each of these devices is burdened by size, complexity, or the need for securement on other support structures. Thus, there is need for a camera support structure which is small and light enough to fit into the photographer's pocket, readily engaged on and removed from the camera body, convenient and easy to use, and which provides proper support of the camera.

SUMMARY OF THE INVENTION

In order to aid in the understanding of this invention, it can be stated in essentially summary form that it is directed to a camera quadripod which is comprised of a pair of bipods, each of the bipods being for engaging directly on the camera body to support the camera. The quadripod is provided with arms to embrace the camera body and legs to engage upon a support.

It is thus an object of this invention to provide a camera support structure which is light and pocket-sized so that it can be used almost anywhere. It is another object to provide a quadripod which has four feet to assure stability of the camera supported thereon, with distribution of the weight over the four feet of the camera quadripod, to support the camera even with a heavy lens thereon. It is another object to provide a camera quadripod which can be shaped to properly engage the camera body for proper support and for convenient attachment and removal of the quadripod from the camera. It is a further object to provide a camera quadripod which can be placed on the camera body to engage the camera body for support of the camera either for transverse or upright positioning of the camera body so that photographs can be taken in either orientation.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a perspective view of the first preferred embodiment of the camera quadripod of this invention showing a camera in dashed lines to illustrate the manner of support of the camera body in the horizontal orientation and to show the cooperation between the two bipods which form the camera quadripod.

FIG. 2 is a perspective view of half of the camera quadripod in the preferred embodiment illustrated in FIG. 1.

FIG. 3 is a side-elevational view of the second preferred embodiment of the camera quadripod of this invention showing the quadripod embracing the camera body for taking a photograph in the upright orientation.

DESCRIPTION OF THE PREFERRED EMBODIMENT

The first preferred embodiment of the camera quadripod of this invention is generally indicated at 10 in FIG. 1. It is comprised of two identical bipods 12 and 14 which are described in more detail below. Each of the bipods has crossbar 16 on which are secured upwardly directed arms 18 and 20. Arm 18 is a short arm, while arm 20 is a long arm having an upper portion 22. Arm 20 is curved at 24 so that upper portion 22 extends in a direction to close the space defined between arms 18 and 20. The preferable curve is such that the acute angle between the upper and lower portion of arm 20 is between 14 and 19 degrees.

Boss 26 on the shorter arm and boss 28 on the longer arm 20 are each provided with a threaded hole therethrough generally parallel to the direction of arm 18. Legs 30 and 32 are respectively threaded through the upright holes in the bosses. The lower ends of the legs terminate in feet 34 and 36, respectively, which may be in the form of metallic machine screw heads, but are preferably in the form of rubber feet molded on or otherwise positioned on the lower ends of the legs.

The overall dimensions of each bipod are such that the bipods are small enough to fit into the photographer's pocket for portability and ready availability when needed. Thus, the crossbar 16 is only slightly longer than the width of a conventional camera body, arms 18 and 20 are shorter than the height of such body, and legs 30 and 32 are preferably the same length for convenience and only slightly longer than arms 18 and 20 to allow for sufficient angular adjustments without significantly raising the camera body.

FIG. 1 shows the bipods 12 and 14 of quadripod 10 in conjunction with a camera for supporting of the camera. With the camera in the usual, horizontally oriented or transverse position, the bipods are positioned with the longer arm 20 on the front of camera body 38 on opposite sides of the camera lens 40. In this camera orientation, the longer arms 20 are positioned at the front of the camera body, one on each side of lens 40.

Quadripod 10 is preferably made of aluminum tubing for lightness and strength, and in the first preferred embodiment illustrated in FIGS. 1 and 2, the aluminum tubing is of rectangular or square cross-section. The spacing between arms 18 and 20 is such that the quadripod properly fits most present-day 35 millimeter, single lens reflex cameras. However, the tubing of which the quadripod 10 is formed is sufficiently malleable that, with the application of gentle pressure, the opening between arms 18 and 20 can be adjusted by bending arm 20 at curve 24. The proper fit is one where the camera body can rest on crossbar 16 and engage against the shorter arm 18 and just contact the inwardly curved upper portion of the longer arm 20 with sufficient compressive force to maintain the bipod in engagement with the camera body and prevent accidental falling off. In this way, the camera is properly engaged and supported.

The threaded securement of legs 30 and 32 into the corresponding bosses permit the rotation of the legs to adjust the extension thereof below crossbar 16. The legs are rotated into the desired position, preferably a position wherein all four of the feet engage a supporting surface. In this way, proper camera support is achieved, and orientation is adjusted.

Camera quadripod 50 is illustrated in FIG. 3 and is the second preferred embodiment of the camera quadripod of this invention. Quadripod 50 comprises a pair of bipods, one of which is shown at 52 in FIG. 3, and the other of which is of the same configuration and is hidden directly behind it in FIG. 3. Bipod 52 comprises crossbar 54 to which is secured shorter arm 56 and longer arm 58. Longer arm 58 has an upper portion 60 which is angled inwardly toward shorter arm 56 at curve 62. Similarly to the upper portion of arm 20, the upper portion of arm 58 is angled inward in a direction to close the opening between the two arms by an angle substantially between 14 and 19 degrees.

Bosses 64 and 66 are respectively secured to arms 56 and 58 and have upright threaded holes therethrough. Legs 68 and 70 are respectively threaded through the bosses. Feet 74 and 76 are respectively secured on the lower ends of the legs. Feet 74 and 76 are preferably of resilient, non-skid, non-marking material. The lengthwise adjustment of the legs in their bosses by leg rotation provides the angular arrangement of quadripod 50 with respect to the supporting surface such as top 78 (see FIG. 3).

The quadripod 50 is preferably made of round tube of light, malleable metal such as aluminum. It is optionally provided with caps 80 and 82 of resilient material for engaging on the camera body 38. Furthermore, resilient covering 84 may cover crossbar 54 in order to improve engagement on the camera body for a better support thereof. As illustrated in FIG. 3, when the camera is turned on its end to take upright pictures, the quadripod is engaged around the end of the camera body with the longer arms positioned on the back of the camera body away from the lens. In this arrangement, the longer arms can reach around the end of the camera body farther than the edge of the lens and, with the shorter arms positioned on the front of the camera body, they reach substantially up to the lens. This provides for better support in the more usual orientation of FIG. 1. In the arrangement shown in FIG. 1, the longer arms are positioned in front of the body where they provide more support; and, in the arrangement of FIG. 3, the longer arms are positioned to the rear of the camera body where they do not interfere with the lens. In this way, firm support is provided by the quadripod of this invention, which is small of size, light of weight, and easy to use.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A camera quadripod comprising:
   a pair of substantially identical bipods, each of said bipods having first and second spaced arms, one of said arms being resilient, a crossbar interconnecting said arms so that a camera body can be engaged on said crossbar and resiliently detachably embraced within said arms for support of the camera body, each of said bipods having first and second spaced legs, at least one of said legs on each of said bipods being adjustable for supporting said quadripod in a selected position and for supporting a camera engaged within the arms of and supported by said quadripod in a selected position.

2. The camera quadripod of claim 1 wherein one of said arms is a longer arm and the other of said arms is a shorter arm.

3. The camera quadripod of claim 2 wherein said longer arm is the resilient arm.

4. The camera quadripod of claim 3 wherein said tubing is round tubing.

5. The quadripod of claim 3 wherein said tubing is rectangular tubing.

6. The camera quadripod of claim 2 wherein at least the outer end of one of said arms extends at an angle toward the other of said arms.

7. The quadripod of claim 6 wherein the outer end of said longer arm is curved toward said shorter arm to permit embrace of the camera body between the ends of said longer and shorter arms.

8. The camera quadripod of claim 7 wherein resilient material covers at least the ends of said arms for engagement on a camera body.

9. The quadripod of claim 1 wherein said support legs are each individually adjustable with respect to the bipod on which they are mounted.

10. The camera quadripod of claim 9 wherein there is a pair of screwthreaded openings in each of said bipods, and said legs are screwthreaded into said openings for adjustment of said legs with respect to said arms, said legs lying substantially parallel to at least one of said arms.

11. The camera quadripod of claim 10 wherein one of said arms is a longer arm and the other of said arms is a shorter arm.

12. The camera quadripod of claim 11 wherein said longer arm is the resilient arm.

13. The camera quadripod of claim 12 wherein said tubing is round tubing.

14. The camera quadripod of claim 12 wherein said tubing is rectangular tubing.

15. The camera quadripod of claim 11 wherin at least the outer end of one of said arms extends at an angle toward the other of said arms.

16. The camera quadripod of claim 15 wherein the outer end of said longer arm is curved toward said shorter arm to permit embrace of the camera body between the ends of said longer and shorter arms.

17. The camera quadripod of claim 16 wherein resilient material covers at least the ends of said arms for engagement on a camera body.

* * * * *